United States Patent [19]

Gould et al.

[11] 4,216,839
[45] Aug. 12, 1980

[54] ELECTRICALLY POWERED MOTOR VEHICLE

[75] Inventors: John S. Gould, Evergreen; Roger D. Winquist, Golden; William R. Eve, IV, Englewood; James V. McCutchen, Littleton; Anthony M. Pelcher, Lakewood; Richard E. Watson, Evergreen, all of Colo.

[73] Assignee: Unique Mobility Inc., Englewood, Colo.

[21] Appl. No.: 926,276

[22] Filed: Jul. 20, 1978

[51] Int. Cl.³ .................. B60L 11/18; B62D 23/00
[52] U.S. Cl. .......................... 180/65 R; 104/134; 105/51; 180/68.5; 267/20 R; 280/721; 280/724; 293/118; 293/133; 296/64; 296/146
[58] Field of Search ............ 180/68.5, 65 R, 65 E, 180/60, 54 F, 55; 105/51, 50; 104/34; 429/100, 99, 96, 97, 98; 296/63, 64, 146; 297/DIG. 6; 267/20 R; 280/721, 722, 724, 725; 293/133, 121, 155, 119, 118, 116, 177; 49/41, 48

[56] References Cited

U.S. PATENT DOCUMENTS

| | | | |
|---|---|---|---|
| 446,817 | 2/1891 | Hunter | 105/51 |
| 638,859 | 12/1899 | White | 180/65 R |
| 667,189 | 2/1901 | Condict | 180/65 R |
| 823,350 | 6/1906 | Morrill | 49/41 |
| 1,165,784 | 12/1915 | Klingelsmith | 180/68.5 |
| 1,391,098 | 9/1921 | Custer | 180/62 |
| 1,504,769 | 8/1924 | Dietz | 293/119 |
| 2,188,082 | 1/1940 | Imhofe | 293/121 |
| 2,254,552 | 9/1941 | Tjaarda | 180/65 R X |
| 2,358,481 | 9/1944 | Slack | 293/118 X |
| 2,862,724 | 12/1958 | Stover | 267/20 R X |
| 2,988,374 | 6/1961 | Boyles | 280/725 |
| 2,997,325 | 8/1961 | Peterson | 293/133 |
| 3,061,031 | 10/1962 | Packard | 180/65 R X |
| 3,202,234 | 8/1965 | Osborne | 180/65 E |
| 3,446,531 | 5/1969 | Froelich | 297/DIG. 6 |
| 3,497,027 | 2/1970 | Wild | 180/68.5 X |
| 3,632,157 | 1/1972 | Lohr | 296/63 X |
| 3,734,554 | 5/1973 | Schwabenlender | 293/121 |
| 3,983,952 | 10/1976 | McKee | 180/68.5 |
| 3,993,378 | 11/1976 | Berkus | 180/68.5 X |
| 4,104,827 | 8/1978 | Opron et al. | 49/41 X |

FOREIGN PATENT DOCUMENTS

| | | | |
|---|---|---|---|
| 155947 | 4/1954 | Australia | 180/62 |
| 2127111 | 12/1971 | Fed. Rep. of Germany | 180/60 |
| 1337208 | 8/1963 | France | 49/48 |

*Primary Examiner*—John J. Love
*Assistant Examiner*—Milton L. Smith
*Attorney, Agent, or Firm*—Sheridan, Ross, Fields & McIntosh

[57] ABSTRACT

An electrically powered vehicle achieves maximum structural strength with minimum weight by utilizing a combined body and chassis formed entirely of plastic material, molded and bonded into an integral composite structure which includes a central, hollow longitudinal beam, top, bottom, and side panels of the vehicle body portion, and a power unit supporting chamber at the forward end closing the forward end of the beam and tying it to the side panels. The beam holds the batteries, and the chamber contains all of the components of the power unit including the controlling device. The structure is thus as rigid and light as possible, in addition to eliminating any possibility of any unwanted grounding or electrical paths. The only metal in the vehicle is that of the additional components such as road wheels, suspension members, steering, and power unit and the fasteners and brackets used to retain them in mounted position.

27 Claims, 23 Drawing Figures

ELECTRICALLY POWERED MOTOR VEHICLE

BACKGROUND OF THE INVENTION

This invention lies in the field of electrically powered motor vehicles and is directed to such vehicles which are strong and light structurally, and which minimize electrical problems while retaining many features found in conventional vehicles having internal combustion engines, so that the transition from driving a conventional vehicle to the electric type will not involve confusion or difficulty.

Electric vehicles have been in use since the turn of the century and have taken many forms. The early passenger vehicles were very heavy and slow and had very short range. They were adequate for many years because their users desired to proceed slowly in any event, and traveled only short distances to shop or visit friends. The batteries could be charged overnight so that the short range on a full charge caused no inconvenience.

Commercial vehicles were developed which were big enough and strong enough to carry a larger supply of batteries which gave them considerably more range, although it was still short. These vehicles were highly suitable for use on routes calling for delivery of foods such as bread and milk. Such routes called for many stops, but the total distance traveled in a day was within the range that was available. Various vehicles of this type are in continuing use today.

More recently, golf carts have come into constantly increasing use, not only for use in playing the game but also for shopping or the like, as in the case of the early passenger vehicles. They are quite satisfactory for such purposes but they are not suitable for general use. They have low speed and short range, and most are not adequately equipped to protect the occupants against inclement weather. They are not rugged enough to cope with traffic, and their low speed is a hazard to other vehicles.

Many experimental vehicles have been produced in recent years in an effort to produce a machine which has the general appearance of a conventional automobile, is large enough and rugged enough to travel in traffic, has enough speed to keep up with traffic, and yet has enough range to be suitable for general urban use. Such a vehicle must have a top speed of more than 50 miles per hour and a range of over 75 miles.

The total amount of power and energy available depends on the capacity of the best batteries currently available. The speed and range in turn are also limited. Consequently, the approach has been to provide space for as many batteries as possible and to provide a vehicle which is as light as possible, while providing the battery space and a rugged construction for safety in use.

PRIOR ART STATEMENT

The following references are submitted under the provisions of 37 CFR 1.97 (b) as having come to the attention of Applicant:

| | |
|---|---|
| Condict | 667,189 |
| Hunter | 446,817 |
| McKee | 3,983,952 |

Condict discloses an electric vehicle having an aft body portion in the form of a rearwardly opening tunnel, and a battery box holding a plurality of batteries, and slidable into and out of the tunnel.

Hunter discloses a street railway electric car having a longitudinally arranged elongate seat at each side and a tunnel of generally rectangular cross section extending under each seat and having rollers along its bottom surface. An elongate battery slide or tray carries a plurality of batteries in a long column and moves on the rollers to carry the batteries into and out of the tunnel.

McKee discloses an electric passenger car which has a tunnel or backbone to receive a tray with a plurality of batteries for powering the car. The body and other components are attached to the backbone. Rollers on the floor of the tunnel or on the tray facilitate insertion of the tray into the tunnel.

The designs presently available have considerable merit, but none has achieved truly simple construction with minimum weight, maximum strength and rigidity, and with adequate protection for the power unit. Moreover, none has presented a battery handling system which avoids the difficulties and inconvenience of dealing with a single battery load of 1000 pounds or more.

SUMMARY OF THE INVENTION

The present invention provides a complete electric car in which the problems mentioned above are overcome, while attaining great simplicity of construction and great ease of operation. Generally stated, in its presently preferred form, the vehicle comprises a combined body and chassis formed entirely of reinforced plastic material, preferably in a high quality fiber glass, and molded and bonded into an integral composite structure including a central longitudinal beam, top, bottom, and side panels of the vehicle body portion, and a power unit supporting chamber. The beam is hollow and generally rectangular in section and serves as a compartment for the vehicle power cells. The power unit supporting chamber has a rear wall which closes the forward end of the beam and extends over to the side panels of the body portion to tie them to the beam and provide great rigidity. The beam can be sealed or opened at its aft end by a door or closure for reception and removal of the power cells. The bottom panel of the body portion is substantially at the same level as the bottom of the beam, and a portion of it serves as a floor in the passenger compartment. Since the entire structure consists of non-conducting plastic material, it will be apparent that the danger of unintentional electrical grounding and shorting is eliminated. The front and rear road wheel suspensions and other components are connected directly to the plastic structure.

Ease of handling of the batteries is accomplished by the provision of a plurality of battery containers or trays, each of relatively small size, preferably sufficient to receive four batteries. When the batteries are mounted in the tray they are appropriately connected to each other and to the terminals at the forward and rear ends of the tray. These terminals in turn are connected to electrical contacts, preferably pin and socket, at each end of the tray. When a tray is slid into the aft end of the tunnel, a second tray is inserted and its forward contacts engage the rear contacts of the preceding tray. This process is repeated until the beam is filled. Another pair of cooperating contacts is mounted on the rear wall of the chamber within the front end of the beam and is engaged by the forward contacts of the foremost tray.

Terminals on the inside of the rear wall of the chamber are provided for connection to cables leading to the control and power units. Since the individual trays are relatively short, they can be readily handled by a workman and placed on relatively small hand carts. The separability of the trays avoids the necessity for an excessive clearance space behind the vehicle which would be required for maneuvering a single very elongate tray. The battery trays are secured in place by a door on the aft end of the hollow beam which also provides a seal to the battery compartment.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
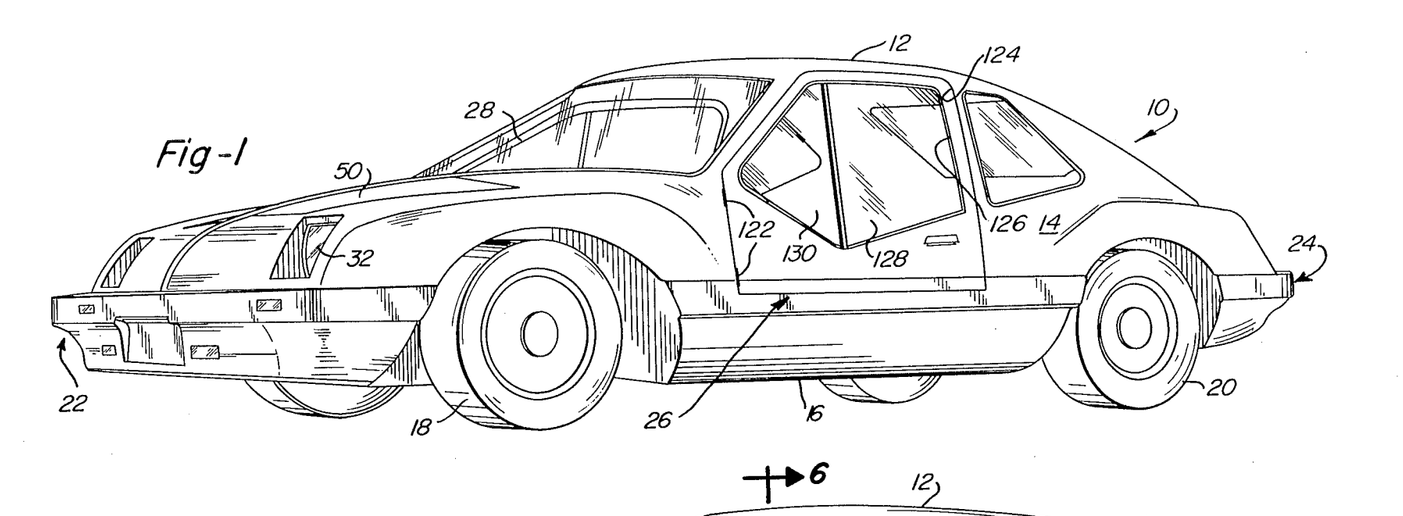
FIG. 1 is a front perspective view of the complete vehicle.
Figure 2:
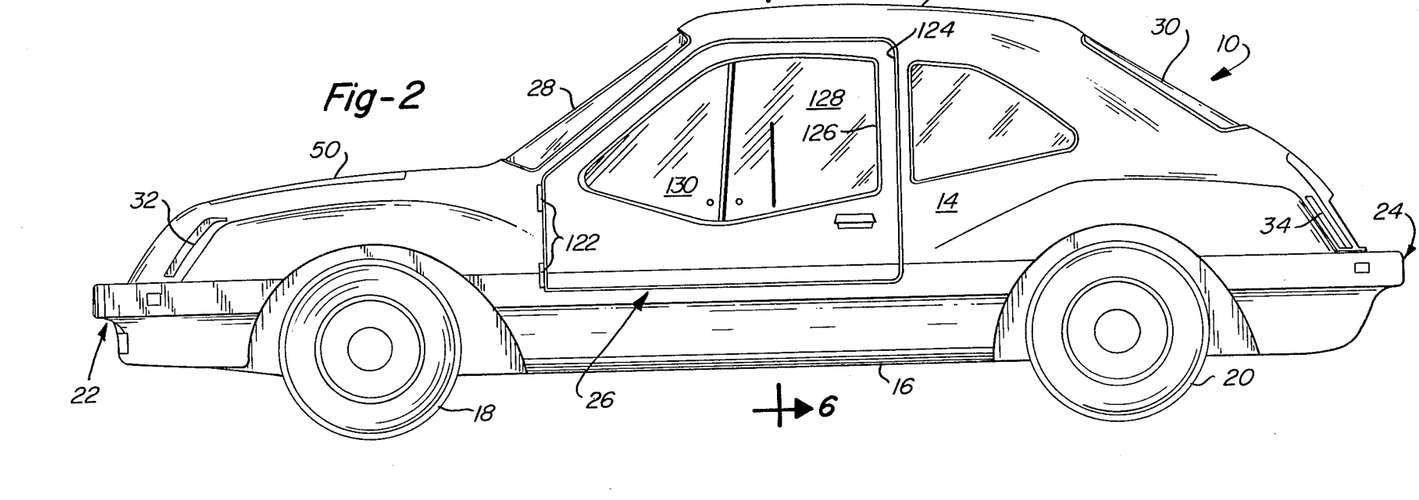
FIG. 2 is a side elevational view of the complete vehicle.
Figure 3:
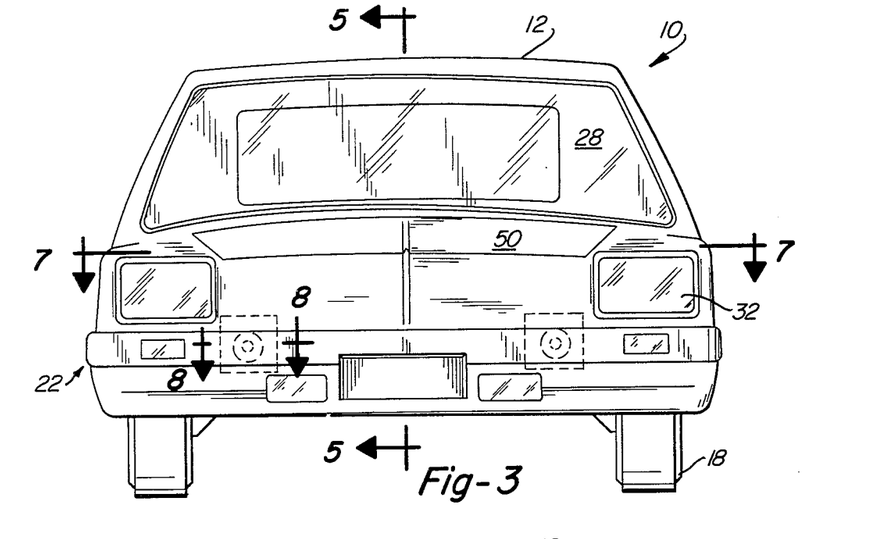
FIG. 3 is a front elevational view of the vehicle.
Figure 4:
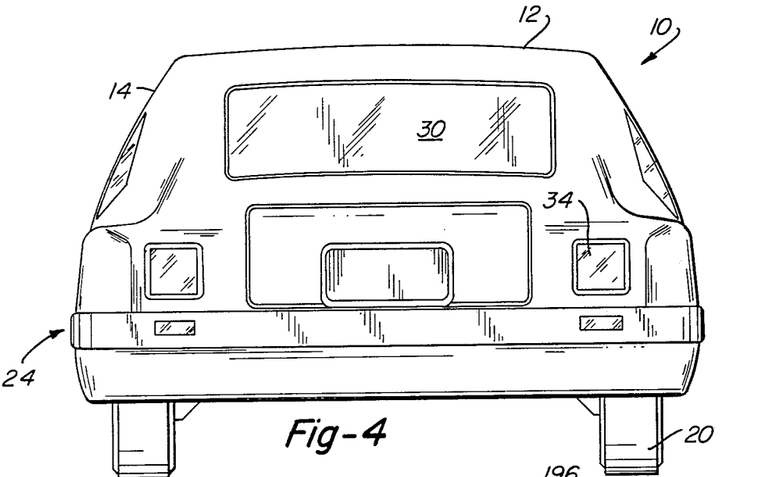
FIG. 4 is a rear elevational view of the vehicle.

The general exterior of the complete vehicle is illustrated in FIGS. 1 and 2, in which the vehicle 10 includes a top panel 12, a side panel 14, a bottom panel 16, front road wheels 18, rear road wheels 20, a front bumper 22, a rear bumper 24, and a side door 26. FIGS. 1 to 4 also show the windshield 28, rear window 30, headlights 32, and tail lights 34.

Figure 5:
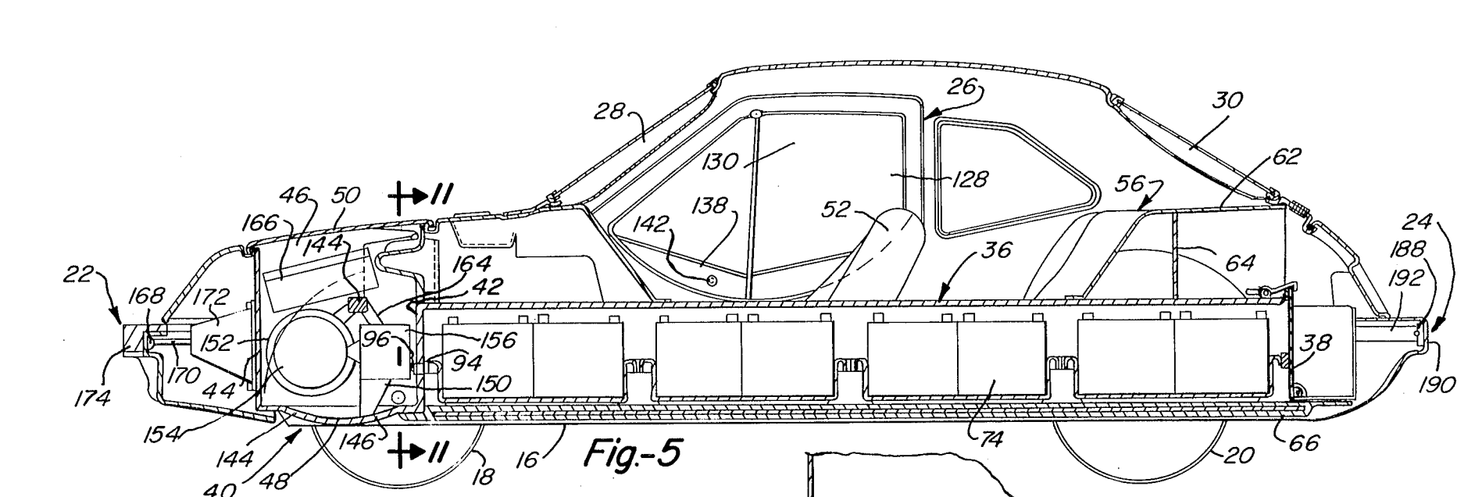
FIG. 5 is an elevational view in section taken on line 5—5 of FIG. 3.
Figure 6:
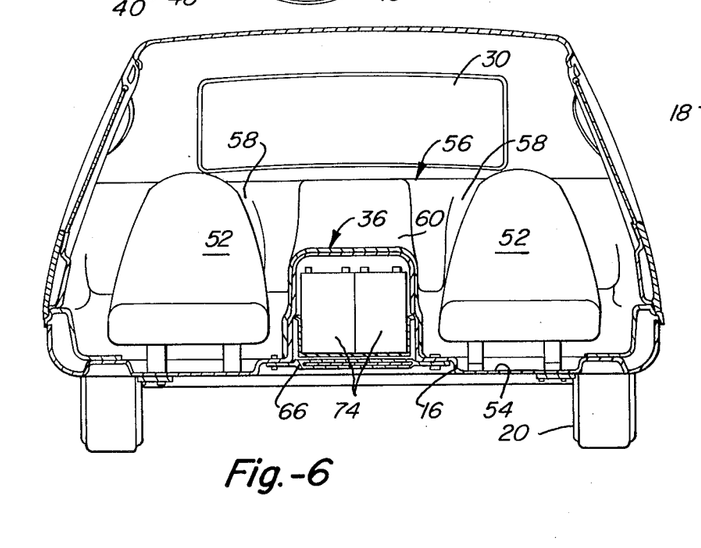
FIG. 6 is an elevational view in section taken on line 6—6 of FIG. 2.
Figure 7:
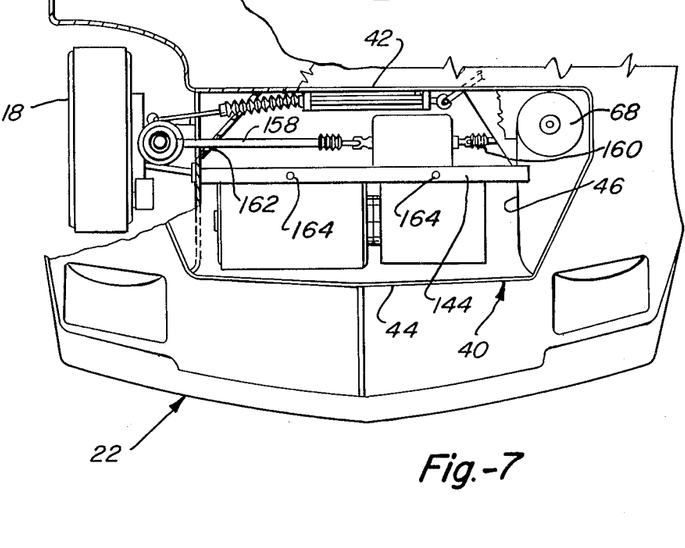
FIG. 7 is a plan view in section taken on line 7—7 of FIG. 3.
Figure 8:
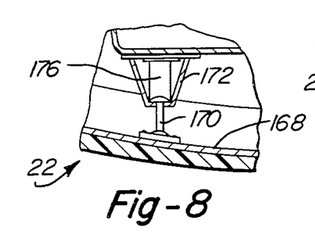
FIG. 8 is a fragmentary plan view, partly in section, of one form of bumper mounting for the front bumper of the vehicle.

Many of the structural details are illustrated in FIGS. 5, 6, and 7. The hollow beam 36 extends longitudinally centrally throughout a major portion of the length of the vehicle and has a generally rectangular cross section as can be seen in FIG. 6. A door 38 closes the aft end of the beam and secures the batteries in position. In the forward portion of the vehicle is located the power unit supporting chamber 40. This chamber includes a rear wall 42, a forward wall 44, side walls 46, and a bottom wall 48 which is substantially flush with the bottom panel 16 to provide a generally streamlined bottom for the vehicle. A conventional automotive hood 50 provides a cover for the chamber. As can be seen in FIG. 5, the rear wall 42 of the chamber closes the forward end of the beam, and the walls continue over to the side panels to tie them to the beam to produce a rigid structure. The chamber also serves as a structural box, open only at the top, which greatly rigidifies the front end of the vehicle.

The front seats 52 are conventional and are mounted on the floor portion 54 of the bottom panel 16, one at each side of the beam. Rear seating is provided by a primary shell 56 (FIGS. 5, 6, and 21) which has a bucket seat formation 58 at each side of the beam and a central portion 60 shaped to match the top and sides of the beam. In addition, the upper part of the shell extends rearward at 62 and downward at 64, and the portion 64 is also shaped to match the top and sides of the beam. The shell is bonded along its matching edges to the top and sides of the beam fore and aft, to the floor, or bottom panel 16, and to the side panels 14 to create a very large box which greatly rigidifies the structure.

In FIG. 6 it will be seen that the bottom panel 16 of the body portion rises up and over the center to define the sides of beam 36, and that a panel 66 is bonded to panel 16 to form the fourth side of the beam.

Figures 11, 12, 13, 14, 15:
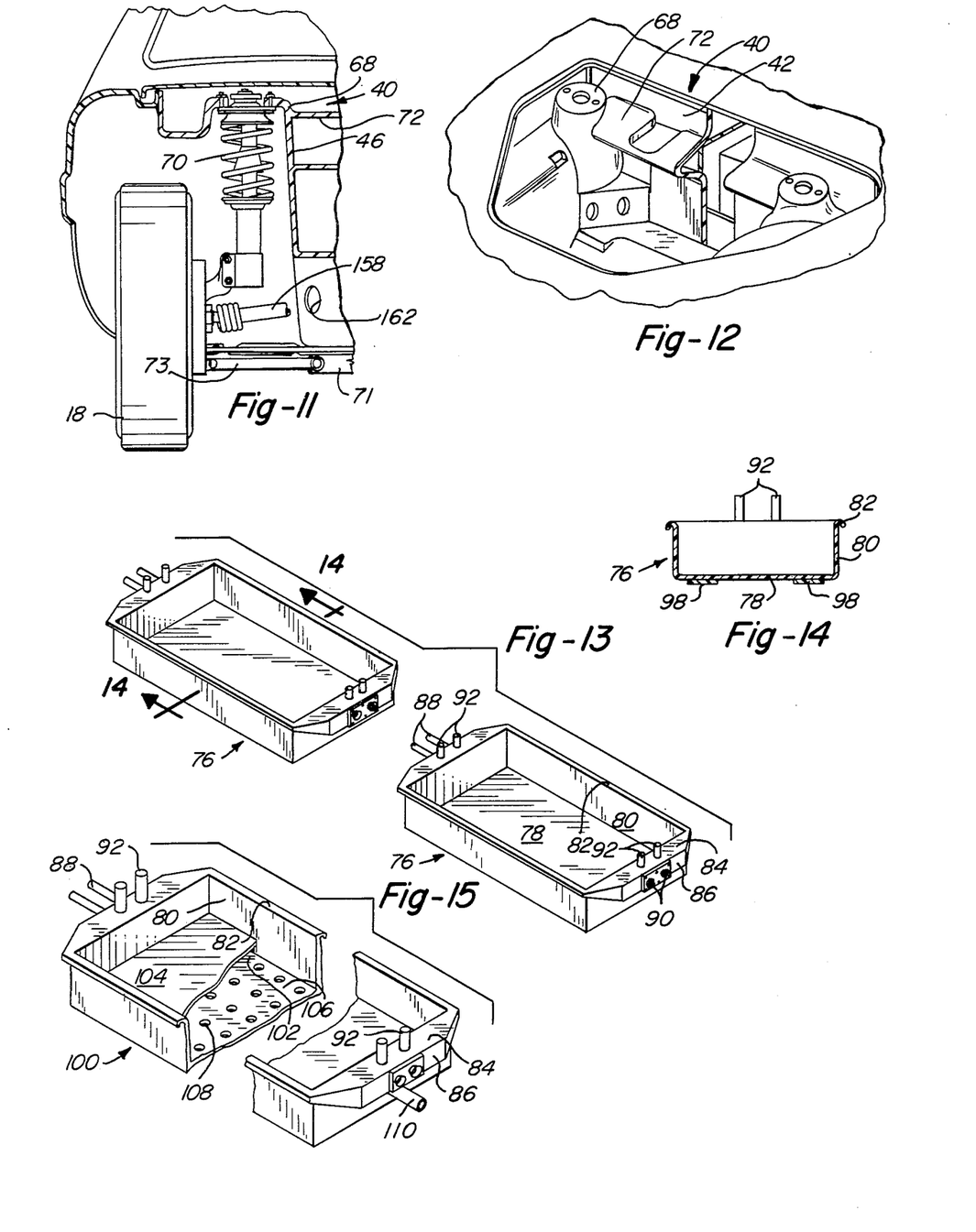
FIG. 11 is a fragmentary front elevational view, partly in section, of a front wheel mounting.
FIG. 12 is a fragmentary perspective view of an upper rear portion of the power unit supporting chamber showing the shock strut mounting.
FIG. 13 is a perspective view of a pair of power cell trays with their cooperating electrical contacts and terminals.
FIG. 14 is a sectional view taken on line 14—14 of FIG. 13.
FIG. 15 is a view similar to FIG. 13, showing a modification of the tray bottom.

In FIGS. 11 and 12 it will be seen that a mounting 68 is provided for connection to the upper end of the combined spring and shock strut 70 for front road wheel 18. This mounting is formed integrally with the upper rear portion of the side wall of the chamber 40 and is duplicated at the opposite side. A horizontal reinforcing and stiffening brace 72 is formed in the rear wall 42 of the chamber, and it extends between mountings 68 and is integral with them. A suspension sub-frame 71 is mounted to the underside of the chamber 40. At each end of the sub-frame is pivotally mounted an A-frame arm 73 which is attached to a road wheel 18. The A-frame arm 73 and shock strut 77 provide the suspension for the road wheel 18. The suspension sub-frame 71 is arranged so that its position can aid in the proper alignment of the front wheels.

FIGS. 5 and 6 illustrate the manner of loading the beam with the power cells or batteries 74 which provide the energy for the power unit. Instead of a single very long and cumbersome slide or tray carrying all of the batteries, a plurality of much shorter trays is provided for ease in handling when it is desired to remove batteries for reloading, or replacing discharged batteries with fully charged ones. While the number of trays shown is four, it may be more or less, depending on the size of the vehicle or other considerations. The trays 76 are all identical and are designed for present purposes to carry four batteries in each.

As seen in FIG. 13, each tray has a bottom 78, vertical walls 80, and flanges 82 which are enlarged 84 at each end, and include carry lips 86. The lip at one end has pin-type electrical contacts 88 and the lip at the opposite end has socket-type electrical contacts 90. When two trays are pushed together endwise, the pins of one engage the sockets of the other and electrical continuity is established. An insulated grommet or feed-through 92 is provided at the battery side of each contact and a conductor from an adjacent power cell or battery leads through this grommet to connect with the contact. All of the batteries in each tray are appropriately electrically connected to each other, and when the trays are inserted end to end in the beam there will be a continuous circuitry from end to end of the column of trays.

The rear wall 42 of chamber 40 is provided, within the forward end of the beam, with electrical contacts 94 located and formed to mate with the forward contacts of the foremost tray when the tray is pushed all the way forward. Since contacts 88 are pin-type in the present design, the contacts 94 are socket-type. Each contact 94 is provided with an electrical terminal 96 within the chamber 40, formed for connection to a conductor leading to the power and control units within the chamber.

In practice, when it is desired to load the batteries into the vehicle, a first tray is placed on a table-top truck of about the same height as the bottom of the beam and moved into proximity with the beam. The tray is then slid off the truck into the beam. The next tray is then similarly moved into position and moved forward until the electrical contacts engage. The second tray is then pushed into the beam and the third and fourth trays are positioned, electrically connected, and pushed into the beam in the same way until the contacts of the first tray engage with the contacts on wall 42 of chamber 40. To remove the batteries, the procedure is reversed and each tray is successively pulled out of the beam, disconnected from the tray ahead, and transferred to a charging station. To facilitate movement of the trays, each one is provided on its bottom 78 with two elongate strips 98 of low friction plastic material such as polyethylene.

A modified form of tray is shown in FIG. 15. In other respects the tray 100 is the same as the tray just described, but it is formed with a double-walled bottom to provide a cavity 102. The upper wall 104 is imperforate and supports the batteries directly. The lower wall 106 is formed with a plurality of apertures 108 to permit outflow of pressurized air from the cavity to the exterior below the bottom. As the air flows out, it produces a thin film of air under the tray and raises it out of contact with the supporting surface and permits it to move with practically zero friction. An inlet port 110 is provided in the tray, communicating with the interior of the cavity to provide a flow path for pressurized air to enter the cavity from an external source. If it is desired to pressurize all of the trays that are within the beam at any time, a forward aperture-type port (not shown) can be formed in the opposite end of the tray to mate with the port 110 on the next succeeding tray in the same general way as the pin and socket electrical contacts. Such ports can readily be plugged when it is not desired to use them.

When the system is used, the first tray has its aperture-type forward port plugged and it is entered into the beam with such port forward. Pressurized air is supplied through port 110 to float the tray off the truck and into the beam. Each successive tray has its forward port temporarily plugged and is floated as close as possible to the preceding tray. It is then unplugged and pushed forward until the ports are mated. Pressurized air is again applied and the second tray, along with the first tray, is floated forward until both are within the beam. This process is repeated until all of the trays are in operative position. To remove the trays the procedure is reversed.

The trays of both types described above are made of reinforced plastic such as fiber glass, except for the electrical contacts and terminals. This carries out the basic scheme of eliminating all conductive paths other than those provided for the electrical circuitry. In addition, the trays can be designed to collapse in accordian fashion to aid in allowing the battery cells to survive a vehicle collision or accident.

A door 38 is pivotally mounted along the bottom edge and arranged to close and seal the beam 36. A sealing gasket is provided around the edge to render the interior of the beam air tight to prevent uncontrolled leakage of the flammable gasses or corrosive liquids from the batteries. Inlet and outlet vents can be provided in the beam which can open when the batteries are being charged or the vehicle is moving, to safely purge the gases from the interior.

Figures 20, 21, 22, 23:
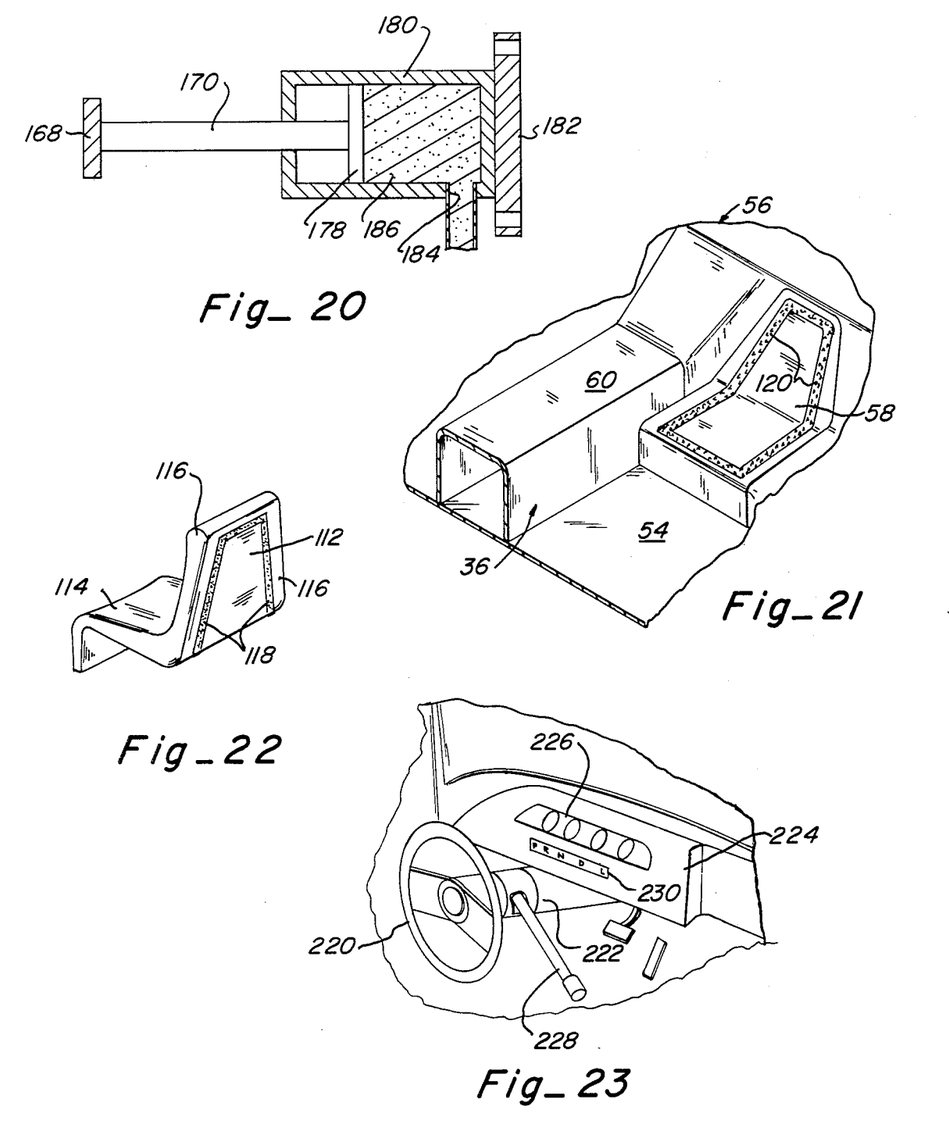
FIG. 20 is a side elevational view, partly in section, of a modified form of front bumper mounting.
FIG. 21 is a fragmentary perspective view of a rear seating structure showing its relation to the beam and the floor.
FIG. 22 is a rear perspective view of a passenger seat shaped to fit the seating structure and showing means for securing it in place.
FIG. 23 is a perspective view of the driver's compartment.

To complete the rear passenger seating, a pair of bucket-type passenger seats 112 are provided. The seat 112 of FIG. 22 is formed of the same reinforced plastic material as the primary shell 56, and is shaped to correspond to the bucket seat formation 58. The padded upholstery 114 may be secured to the seat by any suitable means, but it is presently preferred to secure along the margin of the rear wall of the seat a base strip (not shown) of the loop-type of fastener material, such as Velcro, and to attach a similar strip 116 of the hook-type material along the margin of the upholstery 114. The upholstery is put in place and strip 116 is then folded around the margin of the seat and anchored in place by pressing it against the loop-type strip.

A second, hook-type strip 118 is secured to the back of seat 112 in a position to mate with a loop-type strip 120 located near the margin of bucket seat formation 58. When seat 112 is placed in formation 58 and pressed down firmly, the hooks and loops will engage and anchor the seat in place.

Figure 17:
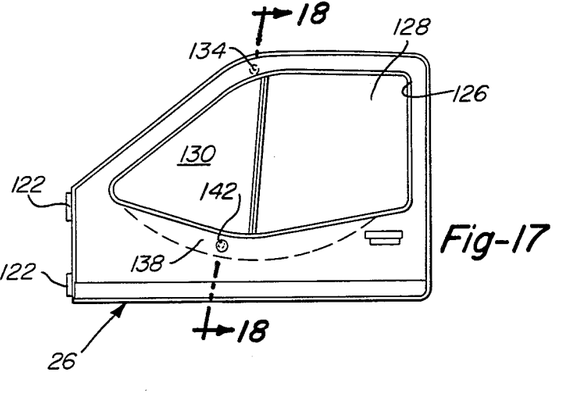
FIG. 17 is a fragmentary side elevation of a right door and its window.
Figure 18:
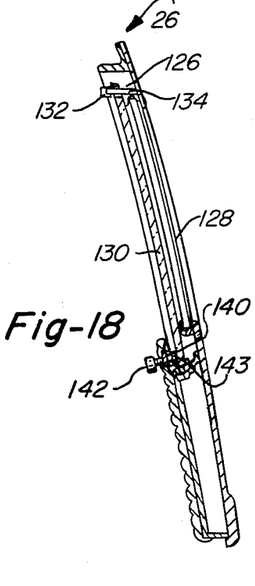
FIG. 18 is a sectional view taken on line 18—18 of FIG. 17.

A door 26 at each side of the vehicle is mounted by hinges 122 in the opening or door frame 124 formed in body side panel 14 and in turn is formed with an opening or window frame 126 in which are mounted first and second window panes 128 and 130. The first window pane 128 is fixedly mounted in the aft portion of window frame 126 and is generally rectangular with its forward edge substantially vertical. The second pane 130 is movably mounted to swing fore and aft. Pane 130 is generally triangular and is provided at its upper apex with a pivotal mounting 132 carried on pivot pin 134 secured to the door frame as shown in FIGS. 17 and 18. When pane 130 is in forward or closed position, its aft edge is generally vertical, adjacent to the forward edge of pane 128, and when it is in rearward, full open position its forward edge is substantially adjacent to the forward edge of pane 128. The lower edge of pane 130 is arcuate and it is mounted for sliding movement in correspondingly shaped guide channel 136 which is mounted in the lower portion of the window frame.

A knob 142 which can be turned from inside, causes a rubber-type bumper to press against the window 130 (see FIG. 18), thereby securing the window in any selected opening position. The window can be locked for security purposes in the closed position by first closing the window and then turning the knob in to where the rubber-type bumper blocks the rearward travel of the window.

The major components of the power unit are shown in position in FIGS. 5 and 7. A support rack 144 is located laterally across the upper portion of chamber 40 from which the major drive components are supported. Each end of the support rack 144 ties into the left and right side of the chamber at points just forward of the front suspension structure columns. This provides a close structural link between loads of the drive components and suspension forces. The support 150 provides additional support through attachment to the differential and restricts movement due to torque generated by the motor 152. As seen in plan in FIG. 7, the transmission 154 is interconnected between the motor and the differential in generally conventional fashion. If desired, the transmission unit can include a variable speed belt drive which will vary the power transmitted to the differential.

Articulated drive shafts 158 and 160 are connected at their inner ends to opposite sides of the differential, and extend laterally outward through apertures 162 in the side walls 46, with their outer ends connected to the front road wheels 18 to drive the vehicle. Hoist connections 164 are provided on the rack for lifting the assembly out of the chamber for servicing. These connections may be eye bolts to engage hoist hooks. The controller 166 is preferably separately mounted on suitable brackets above and to the side of the motor. When it is desired to remove the components for servicing, controller 166 is removed separately, the inner ends of drive shaft 158 and 160 are disconnected from the differential, hoist cables are attached to connections 164, and the components, together with the rack 144, are lifted out as a unit.

Several types of bumpers are available for use on the front end of the vehicle. In FIG. 5 an elongate base member 168 extends laterally across the width of the vehicle and is provided with laterally spaced longitudinally extending support members 170 which are connected at their aft ends to mountings 172. A thick elongate contact member 174 is connected to the base member, and is formed of a strong, resilient elastomeric material such as a polyurethane compound. This contact member can take fairly severe shocks without damage because it yields to the force of a blow and returns back to its original shape.

If desired, contact member 174 may be replaced with a conventional contact member or bumper bar secured to base member 168. An elongate shock absorbing member 176, similar to a standard shock absorber, is located in each housing 172 and the support member 170 is connected to its forward end. This arrangement is capable of absorbing rather severe shocks.

Another type of bumper which may be used on this vehicle is a separate elongated bumper member (not shown) which is attached to the body by means of a foam material directly bonded to the body member. The foam material, although relatively rigid and having sufficient strength to support the bumper, is still resilient enough to absorb a considerable amount of impact energy. Thus, with this arrangement, the shock absorber assembly 170 can be entirely eliminated.

Another type of shock absorbing mounting which turns the shock force into work is illustrated in FIG. 20. Base member 168 is carried by a pair of support members 170 which are connected at their aft ends to pistons 178. Each piston is mounted in a cylinder 180 having a bracket 182 at its aft end for mounting the cylinder to a vehicle. The cylinder is provided adjacent to its aft end with an extrusion aperture or port 184. A body of extrudable material 186 is provided in the cylinder between the piston and the aft end of the cylinder. It can be one of the softer metals such as lead, or various plastic materials of a flowable type. The material selected for a given installation is one which is sufficiently yieldable to be extruded through the port or ports 184 under the pressure of an abnormal force applied .o the piston.

Figure 9:
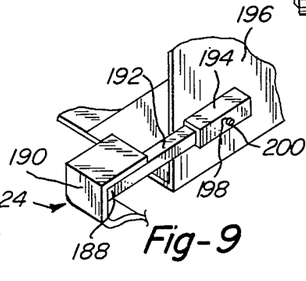
FIG. 9 is a fragmentary perspective view of a rear bumper mounting.
Figure 10:
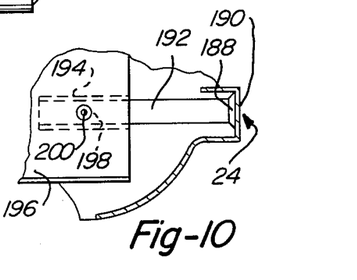
FIG. 10 is a fragmentary side elevational view, partly in section, of the bumper mounting shown in FIG. 9.

The rear bumper 24 is mounted in a different manner, as illustrated in FIGS. 9 and 10. A base member 188 extends across the width of the vehicle, and the bumper bar 190 is mounted on it and substantially coextensive with it. The base member is mounted on two laterally spaced forwardly extending support members 192 in the form of square, hollow tube shanks. Each shank is slidably received in a socket 194 mounted on the aft end 196 of the body portion, and the shank and socket are provided with apertures 198 through their walls which are in registry when the bumper is in operative position. A lock pin 200, such as a PIP pin, is inserted in each set of apertures to lock the bumper in position. It will be seen from FIG. 5 that the bumper is in a position to block entry and exit of the batteries and trays. When it is desired to service the batteries, the lock pins are withdrawn and the bumper is pulled rearward until the shanks leave the sockets and the bumper is then set aside.

Figure 19:
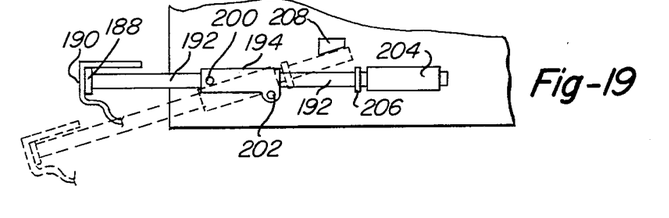
FIG. 19 is a fragmentary side elevational view of a modified form of the rear bumper mounting of FIGS. 9 and 10.

To avoid the necessity for completely removing the bumper and setting it aside, the mounting may be modified as illustrated in FIG. 19. The socket 194 may be pivotally mounted on pivot pin 202, and a second socket 204 is located forward of and in alignment with the first socket. The shank 192 is of sufficient length to enter into the second socket when the bumper is in operative position. A stop in the form of a drive pin 206 is mounted in the shank 192 in a position to limit the extent of removal of the shank from its first socket. The bumper is pulled rearward until stops 206 engage the first socket, and the bumper is now lowered to a position where it does not block the path of movement of the batteries and trays. The extent of lowering of the bumper is limited by engagement of the forward end of each shank with abutment 208.

Figure 16:
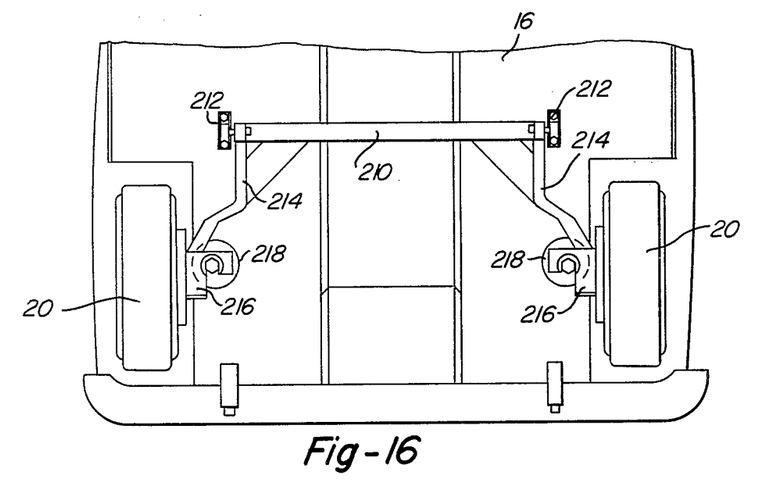
FIG. 16 is a bottom plan view of the rear portion of the vehicle showing the mounting of the rear road wheels.

The rear road wheels 20 are connected entirely to the bottom panel 16 of the body portion of the vehicle. A torsion beam 210 extends laterally beneath the aft portion of the vehicle and is pivotally mounted at its ends in pivotal mountings 212 which are secured directly to bottom panel 16. A trailing arm 214 is fixed to each end of the beam and a rear road wheel 20 is rotatably mounted on the free end 216 of each trailing arm. A combined spring and shock strut 218 is pivotally connected at its lower end to end 216 of the trailing arm and to the wheel, and is connected at its upper end to the wheel recess in chassis member 16.

One of the difficulties encountered in the transition from a standard passenger car to the usual electric car is the difference in the general interior appearance and arrangement and the absence of familiar controls and other devices. This difficulty is at least partly overcome in the vehicle of the present invention. A brake and accelerator or control lever are provided and operate in the usual way. The steering wheel 220 and shaft 222 are mounted in normal position and a dashboard 224 is provided together with an instrument panel 26. A conventional shift lever 228 is mounted on the steering wheel shaft 222 or dashboard 224 and its position indicator 230 is also mounted on the dashboard. While the full range of controls is not normally needed, it is preferred to use a standard position indicator, and the shift lever is operable to move into at least forward and reverse positions in conventional manner to actuate the electrical circuitry or transmission to control the operation of the vehicle and to simulate conventional driving operations.

As an alternative approach, an electrical control for shift selection, such as by push-buttons, could be used. This arrangement would also display shift position.

The electric motor 152 is electrically controlled by the controller 166 which can be of the solid state electronic type. The accelerator or variably positioned control lever in the operator's compartment is operatively connected either mechanically or electrically with the motor controller 166 as well as the transmission, although the transmission could be indirectly controlled by the motor controller. The first portion of the movement of the accelerator or control lever linearly controls the speed of the motor up to maximum. The remaining portion of the lever travel, which can be as much as 25% of the total travel, then controls the torque transmitted by the transmission to the drive wheels. This can be a linear torque progressing to maximum at full travel of the lever. These torque changes can take place while the motor is held at full speed.

In the present embodiment the first portion of the lever travel rotates a rotary potentiometer which controls the motor operation while the remaining travel is transmitted to a linear potentiometer for the additional control of the transmission. With this arrangement, the vehicle has considerable speed and acceleration responsiveness which can be relied upon for passing and emergency situations contrary to most conventional electric vehicles.

While an improved electric vehicle and structure has been shown and described in detail, it is to be understood that this invention is not to be considered to be limited to the exact form disclosed and that changes in detail and construction may be made in the invention without departing from the spirit thereof.

What is claimed is:

1. An electrically-powered motor vehicle comprising:
   a combined body and chassis formed entirely of plastic material and molded and bonded into an integral composite structure;
   the structure including a central longitudinal beam, top, bottom, and side panels of the vehicle body portion, and a power unit supporting chamber;
   the beam being hollow and generally rectangular in section to serve as a compartment for the vehicle power cells and extending throughout a major portion of the length of the vehicle, and being closed at its forward end by the rear wall of the power unit supporting chamber, the aft end being openable for the insertion or removal of the power cells;
   the bottom panel of the body portion being substantially at the same level as the bottom of the beam and providing a floor in the passenger compartment;
   front and rear road wheels mounted by suspension means directly to the plastic structure;
   said suspension means for the front wheels of the vehicle includes mounting means for front shock struts and front springs formed integrally with the upper rear portions of the side walls of the chamber; and
   a horizontal reinforcing and stiffening brace is formed in the rear wall of said power unit supporting chamber and extends between the mounting means.

2. A vehicle as claimed in claim 1; in which
the rear wall of the chamber extends across the vehicle and is united with the body portion side panels to tie them to the forward end of the beam and increase the torsional rigidity of the structure.

3. A vehicle as claimed in claim 1; in which
the chamber contains at least an electric motor, a differential, and articulated drive shafts which extend laterally from the differential through apertures in the side walls of the chamber and which are connected at their outer ends to the front road wheels.

4. A vehicle as claimed in claim 3; in which
a shiftable transmission is connected to the motor to be driven thereby, and is connected in driving relation to the differential.

5. A vehicle as claimed in claim 4; in which
a removable rack is mounted in the chamber; and
the motor, transmission, and differential are supported from the rack and are removable as a unit therewith from the chamber.

6. A vehicle as claimed in claim 1; in which
the chamber is closed at the bottom to prevent entry of dirt and water from the roadway to the power unit and to continue the streamlining of the bottom of the vehicle.

7. A vehicle as claimed in claim 1; in which
rear seating is provided in the form of a primary shell extending from one side panel of the body portion to the other;
the shell having a bucket seat formation at each side and a central portion shaped to match the top and sides of the beam; and
the shell being bonded along its matching edges to the top and sides of the beam, the floor, and the side panels of the body portion to increase the torsional rigidity of the beam and the body portion.

8. A vehicle as claimed in claim 7; in which
a passenger seat is mounted in each bucket seat formation;
each passenger seat has upholstery secured to the seat by hook and loop fastener means; and
each passenger seat is secured to its bucket seat formation by hook and loop fastener means.

9. A vehicle as claimed in claim 1; in which
an opening is formed in each side panel of the body portion;
a door is hingedly mounted in each opening;
a window opening is formed in the upper portion of each door;

a first window pane is fixedly mounted in the aft portion of each window opening;

a second window pane is movably mounted in the forward portion of the window opening; and the second pane is pivotally connected at its upper end to the window frame to swing rearward on occasion to a position laterally adjacent to the first pane to allow air passage through the door.

10. A vehicle as claimed in claim 9; in which the first pane is generally rectangular and its forward edge is substantially vertical;

the second pane is generally triangular, its aft edge is generally vertical in closed position adjacent to the forward edge of the first pane, and its forward edge is inclined downwardly and forwardly;

the pivotal mounting connection of the second pane to the window frame is at the upper apex of the triangle; and the second pane is swingable rearward to a position in which its forward edge is substantially adjacent to the forward edge of the first pane.

11. A vehicle as claimed in claim 9; in which a securing means is provided to lock and hold the second pane in a desired position.

12. A vehicle as claimed in claim 11; in which said securing device is a threaded knob having a pane contacting bumper at one end and which is mounted in said door so that when the knob is turned, the bumper end can be moved into contact with the pane to hold it in position or moved away to allow the pane to swing to a different position.

13. A vehicle as claimed in claim 1; in which the aft end of the hollow beam is closed by a pivotally mounted door, said door having sealing means which seals the hollow compartment and securing means which holds the power cells in rigid position to prevent movement within the beam; and vent means provided in said hollow beam whereby gasses within the beam are purged while the vehicle is in motion.

14. A vehicle as claimed in claim 1; in which a plurality of individual power cell trays is provided for insertion into the hollow beam;

each tray carries a plurality of power cells; and the trays may be inserted end to end in the beam to provide enough power cells to supply the demand of the power unit.

15. A vehicle as claimed in claim 14; in which each tray is provided at each end with electrical contacts formed to mate with contacts on adjacent trays;

each contact is provided with an electrical terminal formed for connection to a conductor leading from an adjacent power cell; and all of the contacts mate with their opposing contacts when the trays are inserted end to end in the beam to produce continuous circuitry from end to end of the column of trays.

16. A vehicle as claimed in claim 15; in which the rear wall of the chamber is provided, within the forward end of the beam, with electrical contacts located and formed to mate with the forward contacts of the foremost tray when the latter is in operating position; and each contact on the chamber wall is provided with an electrical terminal within the chamber formed for connection to a conductor leading to the power unit within the chamber.

17. A vehicle as claimed in claim 14; in which each tray is made of plastic material and is provided on its bottom surface with slide strips of low friction plastic material.

18. A vehicle as claimed in claim 1; in which a bumper is provided extending across the width of the vehicle;

the bumper comprising an elongate base member connected to the vehicle by laterally spaced support members, and a thick, elongate contact member carried by the base member; and the contact member being formed of a strong, resilient elastomeric material.

19. A vehicle as claimed in claim 18; in which the material of the contact member is a polyurethane compound.

20. A vehicle as claimed in claim 1; in which a bumper is provided extending across the width of the vehicle;

the bumper includes an elongate shock receiving member with a plurality of laterally spaced supports; and the aft ends of the supports are attached to longitudinally yieldable shock absorber mountings.

21. A vehicle as claimed in claim 20; in which each shock absorber mounting comprises a cylinder and a piston connected to the aft end of its respective support member and a body of extrudable material in the cylinder at the side of the piston opposite to the support member;

at least one extrusion port is provided in the cylinder wall in communication with the extrudable material; and the material being sufficiently yieldable to be extruded through the port under the pressure of an abnormal force applied to the piston.

22. A vehicle as claimed in claim 1; in which a bumper is provided extending across the width of the vehicle;

the bumper includes an elongate shock receiving member with a plurality of elongate forwardly extending laterally spaced support members;

a socket for each support member is mounted on the aft end of the body portion;

each support member is formed to slide within its respective socket;

apertures are formed in each support member and socket and are arranged in registry with the bumper in operative position; and lock pins are located in the respective registered apertures to prevent unintentional separation.

23. A vehicle as claimed in claim 1; in which a torsion beam extends laterally beneath the aft portion of the vehicle;

a pivotal mounting support is located at each side of the beam and is secured directly to the bottom panel of the body portion;

the ends of the beam are mounted in the pivotal supports;

a trailing arm is fixed to each end of the beam;

a rear road wheel is rotatably mounted on the free end of each trailing arm; and a spring and shock strut are connected to each trailing arm adjacent to the respective wheels and to the bottom panel of the body portion.

24. A vehicle as claimed in claim 1; in which a gear shift lever means is provided in the driver's compartment and connected to vehicle control equipment mounted in the chamber; and the lever means is operable to move into at least forward and reverse positions to actuate the controlling equipment and to simulate driving operations of an internal combustion powered vehicle.

25. An electrically-powered motor vehicle comprising:

a combined body and chassis formed entirely of plastic material and molded and bonded into an integral composite structure;

the structure including a central longitudinal beam, top, bottom, and side panels of the vehicle body portion, and a power unit supporting chamber;

the beam being hollow and generally rectangular in section to serve as a compartment for the vehicle power cells and extending throughout a major portion of the length of the vehicle, and being closed at its forward end by the rear wall of the power unit supporting chamber, the aft end being openable for the insertion or removal of the power cell;

the bottom panel of the body portion being substantially at the same level as the bottom of the beam and providing a floor in the passenger compartment;

front and rear road wheels mounted by suspension means directly to the plastic structure;

a plurality of individual power cell trays is provided for insertion into the hollow beam; each tray carries a plurality of power cells; the trays being arranged to be inserted end to end in the beam to provide enough power to supply the demand of the power unit;

each tray is provided with a double-walled bottom providing a cavity within the bottom;

a plurality of apertures are formed in the lower wall to permit overflow of pressurized air from the cavity to the exterior below the bottom; and an inlet port is provided in the tray communicating with the interior of the cavity to provide a flow path for pressurized air to enter the cavity from an external source.

26. An electrically-powered motor vehicle comprising:

a combined body and chassis formed entirely of plastic material and molded and bonded into an integral composite structure;

the structure including a central longitudinal beam, top, bottom, and side panels of the vehicle body portion, and a power unit supporting chamber;

the beam being hollow and generally rectangular in section to sever as a compartment for the vehicle power cells and extending throughout a major portion of the length of the vehicle, and being closed at its forward end by the rear wall of the power unit supporting chamber, the aft end being openable for the insertion or removal of the power cell;

the bottom panel of the body portion being substantially at the same level as the bottom of the beam and providing a floor in the passenger compartment;

front and rear road wheels mounted by suspension means directly to the plastic structure;

a bumper is provided extending across the width of the vehicle; the bumper includes an elongate shock receiving member with a plurality of elongate, laterally spaced, support member;

a socket for each support member is mounted on the aft end of the body portion;

each support member is formed to slide within its respective socket;

apertures are formed in each support member and socket and are arranged in registry with the bumper in operative position;

lock pins are located in the respective registered apertures to prevent unintentional separation;

a second socket is mounted on the body portion forward of and in alignment with each first socket;

each support member is of sufficient length to enter into the second socket when the bumper is in operative position;

a stop is secured to each support member to limit the extent of its removal from its first socket;

each first socket is pivotally mounted for swinging in a vertical plane to allow the bumper to be lowered out of the path of the power cells when the stops engage the first socket; and an abutment is provided on the body portion to engage the inner portion of each support member as it swings upward to limit the extent of lowering of the bumper.

27. An electrically-powered motor vehicle comprising:

a combined body and chassis formed entirely of plastic material and molded and bonded into an integral composite structure;

the structure including a central longitudinal beam, top, bottom, and side panels of the vehicle body portion, and a power unit supporting chamber;

the beam being hollow and generally rectangular in section to serve as a compartment for the vehicle power cells and extending throughout a major portion of the length of the vehicle, and being closed at its forward end by the rear wall of the power unit supporting chamber, the aft end being openable for the insertion or removal of the power cell;

the bottom panel of the body portion being substantially at the same level as the bottom of the beam and providing a floor in the passenger compartment;

front and rear road wheels mounted by suspension means directly to the plastic structure;

the power unit supporting chamber contains at least an electric motor, transmission, differential, and articulated drive shafts which extend laterally from the differential through apertures in the side walls of the chamber and which are connected at their outer ends to the front road wheels;

a means is provided for electrically controlling the operation of the electric motor; and said controlling means is operatively connected to a variable position lever means controllable by an operator of said vehicle, said lever means being arranged whereby a first portion of travel of said lever means controls the speed of said motor while the remaining portion of travel controls the variable torque characteristics of the transmission while the motor is maintained at maximum speed.

* * * * *